July 18, 1944.   B. E. SHLESINGER   2,353,768
GEAR CUTTER
Filed April 2, 1942   3 Sheets-Sheet 1

Inventor
B. E. Shlesinger

July 18, 1944.    B. E. SHLESINGER    2,353,768
GEAR CUTTER
Filed April 2, 1942    3 Sheets-Sheet 2

Inventor
B. E. Shlesinger

July 18, 1944.  B. E. SHLESINGER  2,353,768
GEAR CUTTER
Filed April 2, 1942  3 Sheets-Sheet 3

Inventor
B. E. Shlesinger

Patented July 18, 1944

2,353,768

UNITED STATES PATENT OFFICE 2,353,768

GEAR CUTTER

Bernard Edward Shlesinger, Irondequoit, N. Y., assignor to Gleason Works, Rochester, N. Y., a corporation of New York Application April 2, 1942, Serial No. 437,404

4 Claims. (Cl. 29—105)

The present invention relates to a tool for producing gears and particularly to a tool for cutting spiral bevel and hypoid pinions.

In present day practice, particularly in the automotive field, it is customary to lap spiral bevel and hypoid gears after they have been cut and hardened. In this way the tooth surfaces may be made smoother and slight corrections in tooth bearing may be effected. In lapping, an abrasive, usually a very fine abrasive powder suspended in oil, is used as the lapping medium, and the pair of gears being lapped is rotated in engagement while slight longitudinal and depthwise movements are effected between them. The gears are meshed during lapping at somewhat less than their operating depth so that the desired longitudinal movements can be effected.

Now it has been found that when a pair of spiral bevel or hypoid gears that have been lapped are meshed together, frequently they contact with a heavy tooth bearing adjacent the tips of the teeth of one of the gears, ordinarily the larger member of the pair, the driven member. This heavy bearing, or "top-line interference," as it is known in the trade, is very objectionable because it makes the gears noisy in use.

The cause of this "top-line" bearing is not entirely known. The most plausible explanation is that in the lapping operation, slight shoulders are formed on the sides of the teeth of the pinion at the points in the tooth heights where lapping leaves off, and since gear and pinion are meshed during lapping at less than full operating depth, these shoulders interfere with the upper portions of the gear teeth when gear and pinion are run together at operating depth.

The shoulders seem to be formed only on the pinion teeth. This is probably because in the lapping operation the pinion teeth lap away more rapidly than the gear teeth since the number of teeth in the pinion is smaller than the number of teeth in the gear.

Whatever be its cause, it has been found that "top-line interference" can be eliminated by relieving or cutting away the tooth surfaces of the pinion in the dedendums thereof prior to the lapping operation. The relief must be far enough up from the roots of the pinion tooth profiles to be above the point of deepest contact with the gear teeth in lapping. The relief prevents the lower parts of the pinion teeth from contacting with the upper parts of the sides of the gear teeth in lapping and hence prevents the formation of the shoulders. The required amount of relief is extremely slight.

The conventional practice is to produce the relief simultaneously with the cutting of the tooth surfaces of the pinion by using a face-mill gear cutter having side cutting edges of two different pressure angles. The side cutting edges of greater pressure angle extend for the greater portion of the height of the tool and cut the greater portion of the height of the pinion tooth to the desired operating pressure angle. The side cutting edges of smaller pressure angle are adjacent the tip of the tool and relieve the sides of the pinion teeth in the dedendum portions thereof to a point high enough to avoid formation of any shoulders on the teeth in the lapping operation.

The double pressure angle type of tool has accomplished its purpose successfully enough, but it is difficult to make and gauge. Moreover, the tooth surfaces, which it cuts on the pinion, are surfaces having two different pressure angles, and these surfaces intersect at an angle to one another and tend to form a ridge.

One object of the present invention is to provide a face-mill gear cutter capable of eliminating top-line interference, which will be easier to make and easier to gauge than the tools heretofore made for the purpose.

A further object of the invention is to provide a face-mill gear cutter which will produce relieved surfaces that join the main portions of the sides of the teeth in a smooth curve.

Other objects of the invention will be apparent hereinafter from the specification and from the recital of the appended claims.

The teeth of spiral bevel and hypoid pinions are usually cut one side at a time, and for this reason face-mill gear cutters used in cutting such pinions are ordinarily provided with all outside or with all inside cutting blades, so that all of the cutting edges may cut on one side of the pinion teeth and a fine tooth surface finish may be obtained. It is accordingly preferred to provide face-mill cutters constructed according to this invention with all outside or all inside blades. The blades of a face-mill gear cutter made according to this invention have a given pressure angle for the greater portions of their heights but have projecting parts formed on their sides adjacent their tips. The projecting parts of the blades have side edges which are parallel to and offset from the sides of the main portions of the heights of the blades and are intended to cut in the dedendum portions of the pinion teeth. The projecting portions of the blades cut away and relieve the pinion in the dedendum portions thereof so that, as desired, formation of shoulders in the subsequent lapping operation is avoided. The side-cutting edge of a blade of a cutter made according to the preferred embodiment of this invention comprises then, two straight parallel portions of the same pressure angle, one offset from the other, and joined by a suitable connecting portion. In addition, the blade is preferably rounded at its tip.

Figure 1:
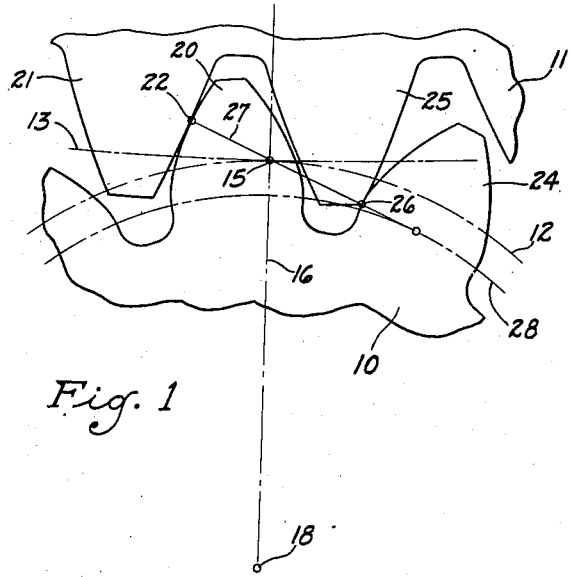
Fig. 1 is a view illustrating diagrammatically how the teeth of a spiral bevel gear and pinion, which have unrelieved tooth surfaces, contact when rotated together in mesh.

In Fig. 1, there is shown fragmentarily a pair of conventional spiral bevel gears in mesh. The pinion or smaller member of the pair is denoted at 10 and the gear or larger member of the pair at 11. The pitch surface of the pinion is designated 12 and the pitch surface of the gear 13. The two pitch surfaces are tangent to each other at the point 15, which lies on the line 16 connecting the pinion axis 18 with the gear axis (not shown).

In the position shown, two teeth 20 and 24, respectively, of the pinion are in contact with two teeth 21 and 25, respectively, of the gear at the points 22 and 26, respectively. These points lie on the line 27 which is the path of the points of contact of gear and pinion. For involute gears, this line will be a straight line, normal to the tooth profiles at the points of contact and tangent to the base circle 28 of the pinion and the base circle (not shown) of the gear. In the position shown in Fig. 1, the point 26 is one extreme point in the line of contact, for it is here that the addendum or top circle of the gear teeth crosses the line of action 27.

Figure 2:
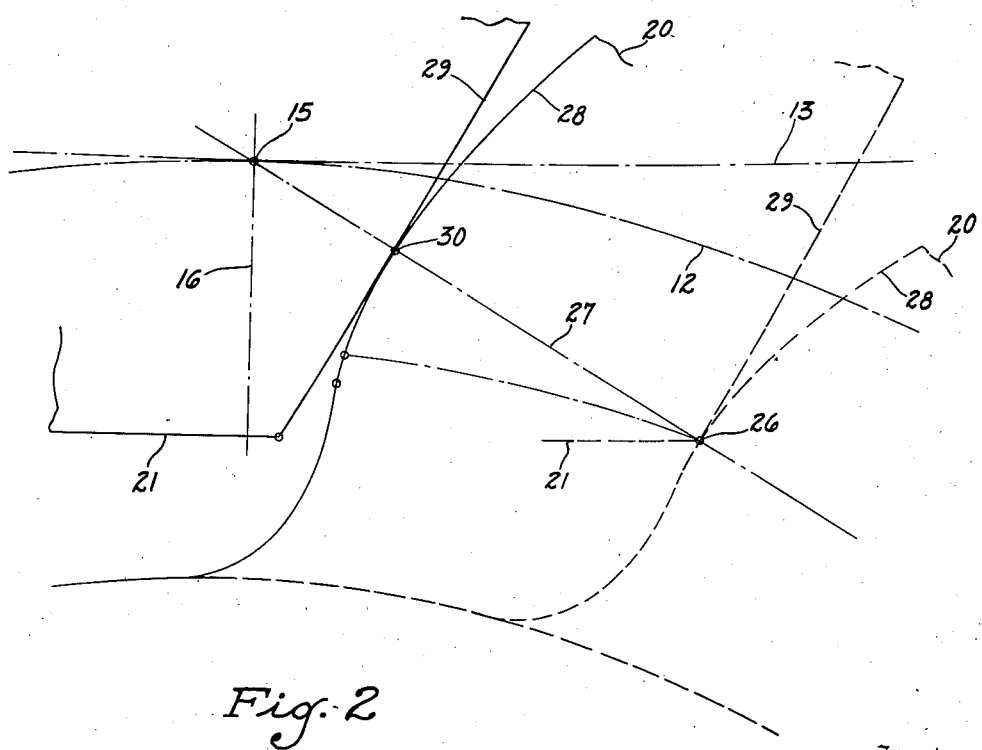
Fig. 2 is a diagrammatic view on an enlarged scale further illustrating the meshing contact of such gears.

The mesh between this conventional gear and pinion is further illustrated diagrammatically in Fig. 2. Here teeth 20 and 21 of pinion and gear, respectively, are shown in full lines and in dotted lines, respectively, in two different positions of contact as the gear and pinion rotate together. In the full line position, the side 28 of the pinion tooth contacts the side 29 of the gear tooth in a point 30. In the dotted line position, these tooth sides contact in the point 26 which, as already noted, is one extreme point of contact between the tooth sides. The point 30 is a point intermediate the points 22 and 26.

In Figs. 1 and 2, a gear and pinion are shown in mesh at operating depth. In accordance with customary practice, the teeth of gear and pinion do not bottom in one another, but there is a substantial operating clearance between the tops of the teeth of one member of the pair and the bottoms of the tooth spaces of the other member of the pair. Moreover, in accordance with usual practice, there is some back-lash provided between the teeth.

As already stated, in lapping, gear and pinion are meshed at less than operating depth and shoulders are likely to be formed on the teeth of the pinion where the tooth profiles of the gear leave off contact with the tooth profiles of the pinion. These shoulders will be formed at points somewhat above the point 26 because, as stated, the gear and pinion in lapping are not meshed at operating depth. It is the purpose of the present invention to provide a tool that will cut away or relieve each pinion tooth in the dedendum thereof so that shoulders will not be formed in the lapping operation and so that when the gear and pinion are meshed together subsequently at full operating depth, there will not be any top line interference.

Figure 6:
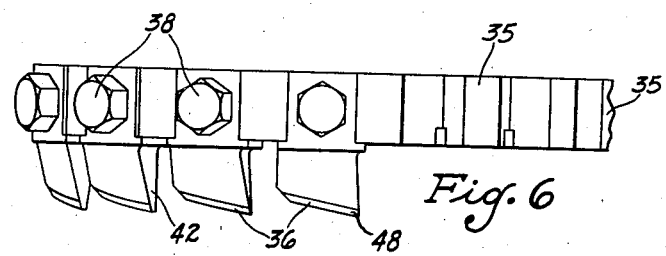
Figs. 6 and 7 are a fragmentary elevational view and a fragmentary plan view, respectively, of a face mill gear cutter made according to one embodiment of this invention.
Figure 7:
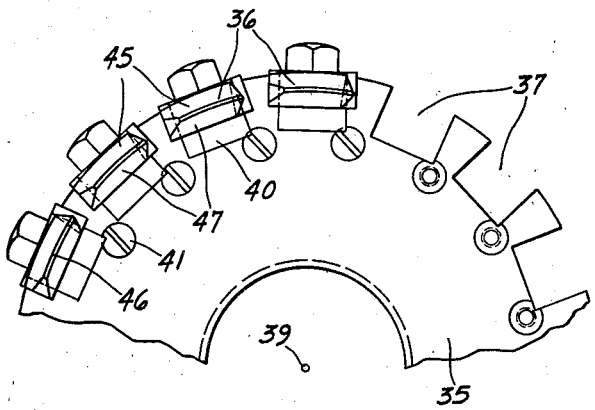
Figure 8:
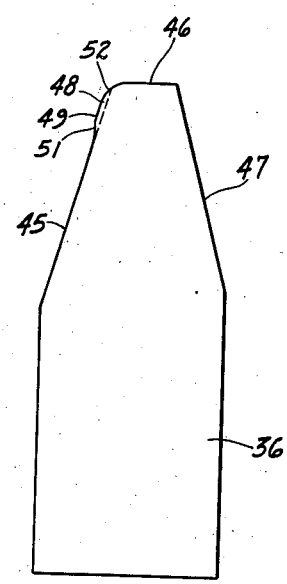
Fig. 8 is an elevational view on an enlarged scale of one of the blades of this cutter.

One form of tool constructed according to this invention is illustrated in Figs. 6 to 8 inclusive. This tool comprises a rotary head 35 and a plurality of cutting blades 36. The blades are arranged circularly about the axis 39 of the head and are so mounted that their cutting portions project beyond one side face of the cutter head in the general direction of the axis 39 of the head. They are secured by bolts 38 in peripheral slots 37 provided in the cutter head. Wedges 40 may be interposed between the blades and the inside walls of the slots 37 to permit of adjusting the blades 36 radially of the axis 39. Screws 41, which thread into the cutter head and whose heads engage in kerfs in the wedges, permit of adjusting the wedges axially to affect the desired radial adjustment of the blades. This is usual construction in face-mill cutters.

In the tool shown, each blade has an outside cutting edge, the front face 42 of each blade being sharpened with a side rake so that the front face is inclined at an acute angle to the outside surface 45 of the blade. Each of the blades is relieved both on its outside surface 45 and its tip surface 46 back of its front face. It may, also, be relieved on its inside surface 47.

The outside surface 45 of each blade is so ground as to have a projecting portion 48 adjacent its tip 46. The outside surface 49 of this projection 48 is parallel to and offset from the greater portion of the height of the outside surface 45 of the blade. The projection 48 and the main portion of the outside surface of the blade are connected by a transition portion 51 of curved profile shape, preferably of circular arcuate profile shape.

The outside cutting edge of each blade comprises, therefore, two straight portions which are parallel to and offset from one another and a curved connecting portion. One of these straight portions extends for the greater part of the height of the blade and is formed by the intersection of the outside surface 45 of the blade with the front face of the blade. The other straight portion lies adjacent the top of the blade and is formed by the intersection of the side surface 49 of the projection 48 with the front face of the blade.

By dressing a grinding wheel to the complementary profile shape, the parts 50, 51 and 49 of the outside surface of the blade can be relief-ground simultaneously so that the projection 48 and connecting portion 51 will extend from front to rear of each blade parallel to the tip surface 46 of the blade, and hence the blade will maintain its shape after sharpening.

To avoid a sharp corner, it is preferred to round off the side of the projection 48 at its juncture with the tip or end surface 46 of the blade. The blade is therefore ground with a round such as denoted at 52.

In cutting a pinion with a tool constructed according to this invention, the cutter is rotated in engagement with the pinion blank and simultaneously a relative rolling movement is produced between the cutter and blank to generate the tooth profiles of the pinion. In the generating operation, the cutter, as usual, represents a tooth of the basic gear to which the pinion is to be generated conjugate. This may be a crown gear or it may be a tapered gear corresponding, for instance, to the gear which is to mate with the pinion.

Figure 3:
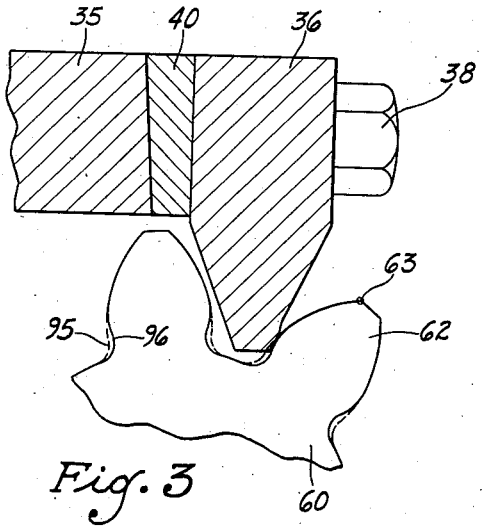
Fig. 3 is a view illustrating diagrammatically how the tooth surfaces of one member of the pair, the pinion, may be relieved in the dedendum portions thereof by a tool constructed according to the present invention.

Fig. 3 shows the finish-cutting operation on a pinion 60 whose teeth 62 have previously been roughed out. The relation between tool and work in generation is illustrated diagrammatically on a larger scale in Fig. 4. Here it is assumed that the basic generating gear is a crown gear represented by the tool. The pitch surface of this crown gear is denoted at 70, while the pitch surface of the pinion is designated at 71. 72 is the pitch point, the point of tangency of the pitch surfaces 70 and 71. The line of action, that is, the line which contains the points of contact between the cutting blades and the profile of the pinion teeth during generation is denoted at 73. This line is tangent to the base circle 65 of the pinion at the point 74.

Figure 4:
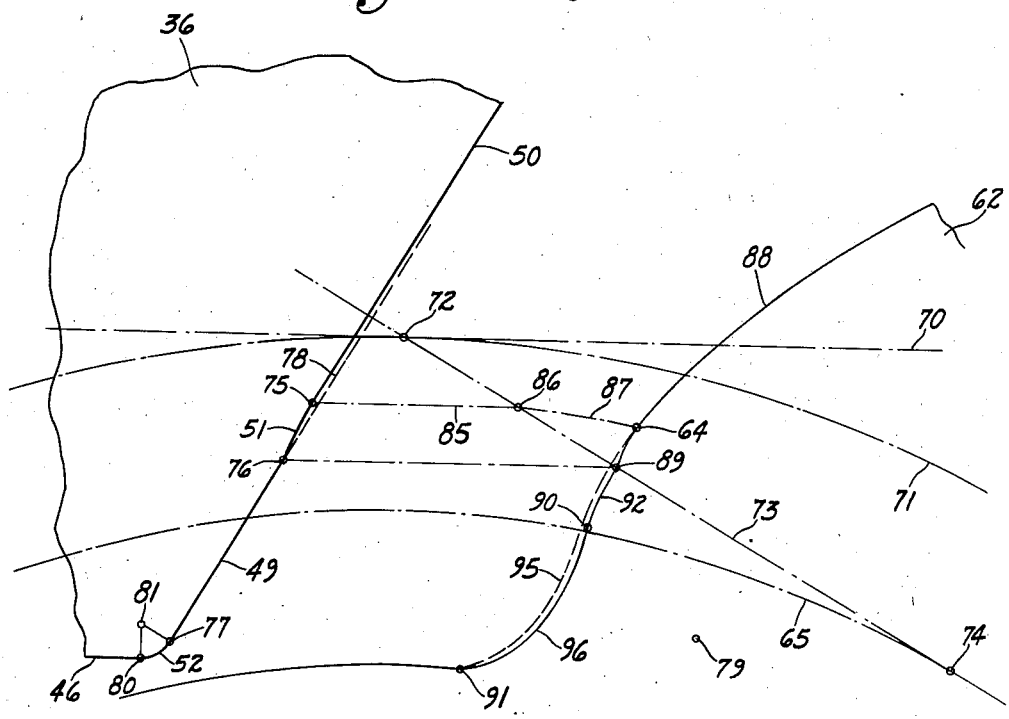
Fig. 4 is a diagrammatic view further illustrating the cutting action of this tool in the production of a tooth surface of the pinion.

As has already been observed, the cutting edge of each blade 36 of the tool consists of a principal part 50 of straight profile extending for the greater portion of the effective cutting height of the blade, of a part 49 which is parallel to and offset from the part 50 and which lies adjacent the top of the blade, and of a connecting portion 51. In Fig. 4, the part 50 of the cutting edge is shown terminating at the point 75. The upper portion 49 of the cutting edge has the same pressure angle as the part 50 and extends from the point 76 to the point 77. It is offset from the part 50 a distance 78. It is connected with the part 50 by the circular arcuate portion 51 which is tangent to portion 50 at point 75 and terminates at point 76. The edge round 52 at the juncture of the side of the blade with tip 46 of the blade begins at the point 77 and extends to point 80 and its center is at 81.

Now in the generating operation, as the tool rotates in engagement with the blank and the tool and blank roll together, the parts 50 of the side cutting edges of the blades of the cutter generate the profile of a pinion tooth from the tip 63 of the tooth down to the point 64. This point is obtained by projecting the point 75 in the tool to the line of action 73 along a line 85 parallel to the plane pitch surface 70 of the generating crown gear, and then swinging the point 86 so obtained about the axis of the pinion along the circular arc 87 until it reaches the tooth profile 88 of the pinion tooth at point 64.

In like manner it can be ascertained that the part 51 of the cutting profile will produce the portion of the pinion tooth surface lying between the points 64 and 89, the point 89 being in the shown position of the pinion tooth a point on the line of action 73.

Now it is a well known fact of gear geometry that any point below or inside the base circle of a pinion is generated by the corner or edge round of the cutting tool and not by the side of the tool. Hence, the part 49 of the cutting profile lying between the points 76 and 77 can only generate down to the base circle 65 and may, in fact, cease generation at a point slightly above the base circle. In the instance shown, the generating action of the side edge 49 ceases at a point 90 slightly above the base circle. The remaining part of the tooth profile, that is, the fillet portion lying between the point 90 and the point 91 is generated by the round 52 on the cutting profile as the tool rolls with the blank.

If the basic generating gear is a true crown gear, the part 88 of the tooth profile of the pinion will be of what is generally referred to as involute shape. The portion 89—90 of the tooth profile will then also be an involute, and parallel to the involute portion 88 but offset therefrom by the amount of offset between the parts 50 and 49 of the side cutting edge of the tool. The part 64—89 of the tooth profile, which connects the two involute portions of the tooth profile, consists of an upper convex portion tangent to the involute 88 at point 64 and of a lower concave portion tangent to the involute 92 at point 89. The upper convex part of this connecting portion is generated by the circular arcuate portion 51 of the cutting profile, while the lower concave portion of this connecting part is generated by the point 76 in the cutting profile.

It will be seen that the projecting portion 49 of the cutting profile cuts the pinion tooth back of the position which it would have if the straight cutting edge 50 of the tool extended for the full height of the blade. In other words, the side profile of the pinion tooth is relieved in the dedendum portion below the point 64. The dotted line 95 shows the profile which would be generated by a tool having a straight cutting edge for its full height and the full line 96 shows the shape actually generated by the cutter of this invention.

Figure 5:
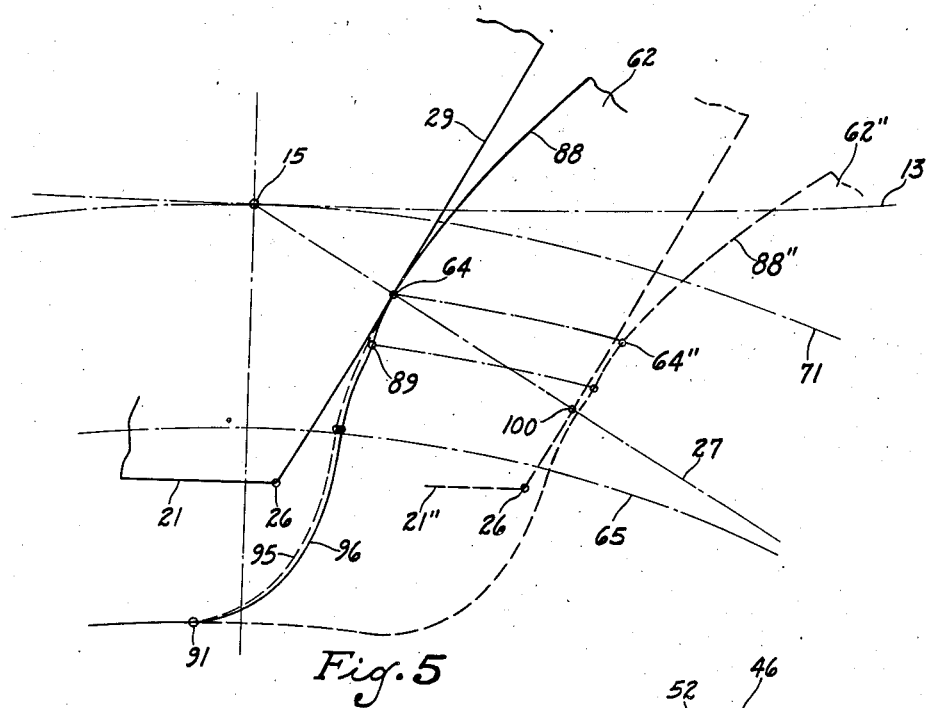
Fig. 5 is a diagrammatic view showing how the dedendum portions of the sides of the teeth of a pinion relieved according to the present invention will have clearance with reference the tops of the flank portions of the sides of the teeth of a mating gear when they are run together in lapping.

Fig. 5 illustrates how a pinion generated by a cutting tool made according to this invention will mesh with its mating gear before the lapping operation. The teeth 21 and 62, respectively, of gear and pinion are shown in full lines in Fig. 5 in contact at a position in their rotation where the point 64 is the point of contact. This is the point where relief in the pinion tooth starts. At this point 64, the profile 29 of the gear tooth is tangent to the profile 88 of the pinion tooth.

Now if gear and pinion are rotated toward the right, the gear tooth profile will move to some position such as indicated in dotted lines at 21″, intersecting the line of action at point 100. At the same time, the pinion tooth will move to a position 62″ and the point 64 will assume the position 64″. If the pinion tooth profile had not been relieved, the profile of the pinion tooth would intersect the line of action 27 at the point 100, which thus would be a point of contact between the mating profiles of the gear and pinion. Due to the relief on the pinion tooth, however, the pinion profile below the point 64 or 64″ is inside of the line 88'' which is the new position of the involute 88. Hence no contact between the pinion tooth profile and the gear tooth profile can occur below the point 64 (64''). In the lapping operation, then, contact extends downward on the pinion profile only to the point 64 (64''), and the top part of the surface of the gear tooth does not touch the pinion tooth at all, and so no interfering shoulder can be lapped in the pinion tooth surface. Hence, when the lapped gear and pinion are run together after lapping, there will be no top line interference.

The proper height of the projecting portion 48 of a blade, that is, the distance that the projection extends down from the tip of the blade depends upon the pinion to be cut. In practice, however, cutters of a given diameter are standardized with four or five different heights of projecting portions and each cutter will be used to cut a range of jobs.

The tool shown in the drawings has all outside blades for cutting the longitudinally concave side surfaces of the teeth of a pinion. A generally similar cutter with inside cutting edges is used for cutting the longitudinally convex side surfaces of the teeth.

A tool made according to the present invention is quite easy to manufacture because the grinding wheel employed in the relief-grinding operation can readily be dressed to the proper shape. Moreover it is very easy to measure the blades to see whether they conform to manufacturing tolerances. It is obviously easier to gauge two parallel surfaces than two surfaces at an angle to one another. Furthermore, as already pointed out, pinions cut with tools made according to the present invention have improved tooth profiles as compared with pinions cut with a double angle cutter.

While it is preferred to have the projection formed on each blade, it is possible to obtain the same result by putting the projections on blades separate from those which are intended to cut the principal portion of the height of the pinion teeth, and adjusting the blades, which have the projections, radially so as to offset the projections beyond the side surfaces of the blades which cut the principal parts of the heights of the teeth. It will further be understood that while ordinarily it is only necessary to cut one member of the pair of gears with relief, it may be desirable in some instances to cut both members in this manner and that although the invention has been described in connection with a tool for cutting pinions, it is to be understood that it is not so restricted and that either or both members of the pair may be so cut. It will be understood, also, that the invention is applicable to grinding wheels as well as to face-mill cutters and that where the term cutter or cutting edge is used in the claims it is intended to include grinding wheels and grinding profiles.

In general it may be said that while the invention has been described in connection with a particular embodiment thereof, it will be understood that it is capable of further modification and use and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A face-mill gear cutter comprising a rotary head and a plurality of annularly arranged cutting blades whose cutting portions project beyond one side face of the head in the general direction of the axis of the head, the cutting portion of each blade having a projection formed on one side near the top of the blade, the side edge of each projection being parallel to the side edge of the principal part of the blade, the blades being all of the same height and the projections on all the blades being formed at the same distance from the aforesaid side face of the head.

2. A face-mill gear cutter comprising a rotary head and a plurality of annularly arranged cutting blades whose cutting portions project beyond one side face of the head in the general direction of the axis of the head, each of the blades having a side cutting edge of straight profile extending for the principal part of the height of the cutting portion of the blade and having a projection formed thereon near the tip of the blade, said projection having a side cutting edge which is straight and parallel to the side cutting edge of the principal part of the blade, the blades being all of the same height and the projections being all of the same height and being formed on the blades at the same distance from the aforesaid side face of the head.

3. A face-mill gear cutter comprising a rotary head and a plurality of annularly arranged cutting blades whose cutting portions project beyond one side face of the head in the general direction of the axis of the head, some of the side cutting edges of the blades being of positive pressure angle and straight profile for generating the greater portion of the height of a gear tooth, and some of the side-cutting edges of said blades being offset from and parallel to said first named side cutting edges and lying adjacent the tips of said blades for producing a relief in the dedendum portion of the gear tooth, the last named side cutting edges being all of the same height and lying at the same distance from the aforesaid side face of the head.

4. A face-mill gear cutter comprising a rotary head and a plurality of annularly arranged cutting blades whose cutting portions project beyond one side face of the head in the general direction of the axis of the head, all of the cutting portions being sharpened to operate on the same side of a tooth space of a gear blank, and each cutting portion having a side cutting edge comprising a lower portion which extends for the greater part of the height of the blade and which is of straight profile, an upper portion adjacent its tip which is parallel to the lower portion and offset therefrom, and a curved transition portion connecting the upper and lower portions, and each cutting portion being relieved on its side back of said side cutting edge, the upper portions of the blades being all of the same height and lying at the same distance from the aforesaid side face of the head.

B. E. SHLESINGER.